(12) United States Patent
Choi

(10) Patent No.: US 9,557,003 B2
(45) Date of Patent: Jan. 31, 2017

(54) APPARATUS FOR SUPPORTING ELECTRONIC DEVICE

(71) Applicant: Samsung Electronics Co., Ltd., Gyeonggi-do (KR)

(72) Inventor: Inkyu Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/810,010

(22) Filed: Jul. 27, 2015

(65) Prior Publication Data

US 2016/0029500 A1 Jan. 28, 2016

(30) Foreign Application Priority Data

Jul. 25, 2014 (KR) ........................ 10-2014-0094865

(51) Int. Cl.
| | | |
|---|---|---|
| *H04M 1/00* | (2006.01) | |
| *F16M 13/00* | (2006.01) | |
| *H04M 1/02* | (2006.01) | |
| *G06F 1/16* | (2006.01) | |

(52) U.S. Cl.
CPC ............ *F16M 13/00* (2013.01); *G06F 1/1626* (2013.01); *H04M 1/0297* (2013.01)

(58) Field of Classification Search
CPC   G06F 1/1626; G06F 1/166; G06F 2200/1632; G06F 3/03545; H04M 1/04; H04M 1/0297; H04M 1/0214; F16M 13/00
USPC ...... 248/351; 455/566, 575.1; 345/173, 179; 361/679.3; 439/164
See application file for complete search history.

(56) References Cited

U.S. PATENT DOCUMENTS

| | | | |
|---|---|---|---|
| 2007/0117430 A1* | 5/2007 | Lin | .................. G06F 1/1626 439/164 |
| 2008/0291178 A1 | 11/2008 | Chen et al. | |
| 2010/0007251 A1* | 1/2010 | Hsu | .................. F16M 13/00 312/223.1 |
| 2010/0142175 A1* | 6/2010 | Cheng | .................. F16M 13/00 361/825 |
| 2011/0234547 A1 | 9/2011 | Liang | |

FOREIGN PATENT DOCUMENTS

| | | | | |
|---|---|---|---|---|
| EP | 2 259 168 | | 12/2010 | |
| JP | EP 2407853 A1 * | 1/2012 | ........... G06F 1/1626 | |

OTHER PUBLICATIONS

European Search Report dated Feb. 5, 2016 issued in counterpart application No. 15178132.5-1751, 7 pages.

* cited by examiner

*Primary Examiner* — Todd M Epps
(74) *Attorney, Agent, or Firm* — The Farrell Law Firm, P.C.

(57) ABSTRACT

An apparatus for supporting an electronic device is provided. The apparatus includes a first body and a second body. The first body is configured to be inserted into an insertion hole of the electronic device. The second body is configured to adjust an angle with respect to the first body, and to support the electronic device at an outside of the electronic device. A supporting angle of the electronic device is adjustable based on the angle between the first body and the second body.

12 Claims, 15 Drawing Sheets

US 9,557,003 B2

APPARATUS FOR SUPPORTING ELECTRONIC DEVICE

PRIORITY

This application claims priority under 35 U.S.C. §119(a) to a Korean Patent Application filed on Jul. 25, 2014 in the Korean Intellectual Property Office and assigned Serial No. 10-2014-0094865, the entire disclosure of which is incorporated herein by reference.

BACKGROUND

1. Field of the Invention

The present invention generally relates to an apparatus combining with an electronic device and thereby supporting the electronic device.

2. Description of the Related Art

With the advance of digital technologies in these days, the use of audiovisual contents, such as Digital Multimedia Broadcasting (DMB), movies, etc., using an electronic device are increasing. In order to easily use such audiovisual contents without requiring a user to grip an electronic device with his or her hands, a variety of supporting apparatuses have been developed. For example, various products such as a battery case or any other case having a holding or supporting function have been recently used as the supporting apparatus.

Currently used products having a function to support an electronic device are, however, used as an independent apparatus which is separate from the electronic device. Since such a supporting apparatus is separately formed and not embedded in the electronic device, it is not easy to carry. Further, due to a considerable volume, a typical supporting apparatus often deteriorates practicability thereof.

SUMMARY

The present invention has been made to solve at least the above-mentioned problems and/or disadvantages and to provide at least the advantages described below. Accordingly, an aspect of the present invention is to provide an apparatus for simply supporting an electronic device and also provide a housing for combining with the supporting apparatus.

According to an embodiment of the present invention, an apparatus for supporting an electronic device is provided, which includes a first body configured to be inserted into an insertion hole of the electronic device, and a second body configured to adjust an angle with respect to the first body, and to support the electronic device at an outside of the electronic device. In the apparatus, a supporting angle of the electronic device is adjustable based on the angle between the first body and the second body.

According to another embodiment of the present invention, a housing of an electronic device is provided, which includes an insertion hole configured to allow a supporting apparatus to be inserted therein, wherein the supporting apparatus includes a first body and a second body.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Hereinafter, the present disclosure will be described with reference to the accompanying drawings. The present invention may be embodied in many different forms and should not be construed as limited to the embodiments set forth herein. Rather, the disclosed embodiments of the present invention are provided so that this disclosure will be thorough and complete, and will fully convey the scope of the present invention to those skilled in the art. The principles and features of the present invention may be employed in varied and numerous embodiments without departing from the scope of the present invention.

An apparatus configured to perform a supporting function in accordance with an embodiment of the present invention will be described with reference to FIGS. 1 to 4C, focusing on the structure of the apparatus and a combination scheme between the apparatus and an electronic device.

The apparatus (hereinafter, referred to as a supporting apparatus) configured to perform a supporting function may be formed using a certain auxiliary unit of the electronic device. For example, the supporting apparatus may be realized as a touch pen or an antenna of the electronic device. Although it is described hereinafter that the supporting apparatus is formed as a touch pen, this is only an example and not to be considered as to limit the present invention.

Figure 1:
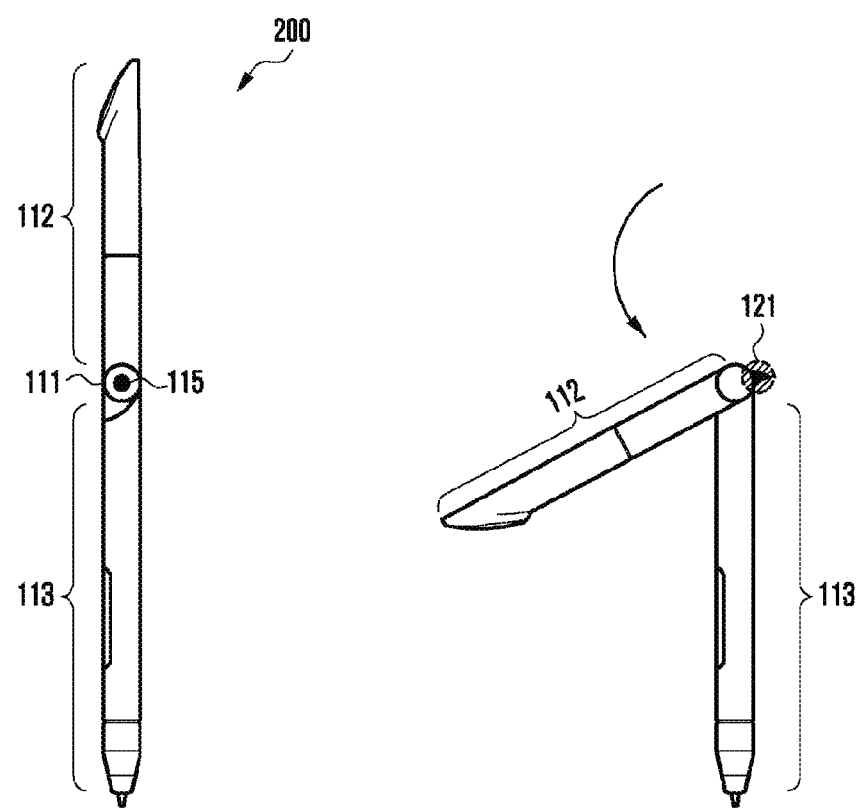
FIG. 1 is a diagram illustrating the structure and operation of a supporting apparatus in accordance with an embodiment of the present invention.

FIG. 1 is a diagram illustrating the structure and operation of a supporting apparatus 200 in accordance with an embodiment of the present invention.

In FIG. 1, a reference numeral 110 denotes an unfolded state of the supporting apparatus 200, and a reference numeral 120 denotes a folded state of the supporting apparatus 200.

Referring to FIG. 1, the supporting apparatus 200 includes a folding joint 111, a first body 113 designed to be inserted into an electronic device when a supporting function is performed, and a second body 112 connected with the first body 113 through the folding joint 111 and designed to be folded at the folding joint 111 within a predetermined angle with respect to the first body 113. In the case of being formed as a touch pen of the electronic device, the supporting apparatus 200 may further include a touch tip or the like used for a touch input on a touch screen.

Additionally, the supporting apparatus 200 may also include a toggle button 115 on the folding joint 111. In this case, by pressing the toggle button 115, a user can adjust an angle between the first and second bodies 113 and 112.

In the unfolded state 110, the first and second bodies 113 and 112 are fixed to each other in a straight line. If the toggle button 115 is pressed, the first and second bodies 113 and 112 are released and can be folded with respect to each other (referred to as a released or foldable state). Then, if any external force is applied to the second body 112 in such a released or foldable state, the second body 112 is folded with an angle with respect to the first body 113.

Folding of the second body 112 is limited to a range within a predetermined angle. For example, when an angle between the first and second bodies 113 and 112 reaches the predetermined angle, the toggle button 115 may be restored to the original state, i.e., non-pressed state. Also, the first and second bodies 113 and 112 may stop moving and remain stationary at this angle. In some embodiments of the present invention, two or more predetermined angles may be used. Such angles may be varied depending on when a user presses and releases the toggle button 115.

According an embodiment of the present invention, in the folded state 120, that is, when the second body 112 is folded with respect to the first body 113, at least one protrusion 121 may appear between the first and second bodies 113 and 112. In the unfolded state 110, that is, when the supporting apparatus 200 is in a straight line, the protrusion 121 may be located in either the first body 113 or the second body 112 and is not visible from the outside. The protrusion 121 may be attached to a part of the second body 112 and thus move and appear in response to a motion of the second body 112. Alternatively, the protrusion 121 may be attached to a part of the first body 113 and thus move and appear in response to a motion of the first body 113. That is, the protrusion 121 is hidden in the first or second body 113 or 112 and may be protruded from the supporting apparatus 200 in response to a motion of the first or second body 113 or 112.

FIGS. 2A to 2D are diagrams illustrating a longitudinal extension of a supporting apparatus in accordance with an embodiment of the present invention.

According to an embodiment of the present invention, the supporting apparatus 200 can be extended in length. For example, the second body 112 may have, at an upper part thereof, an extension cover 211 configured to cover an extension part 231.

Figure 2A:
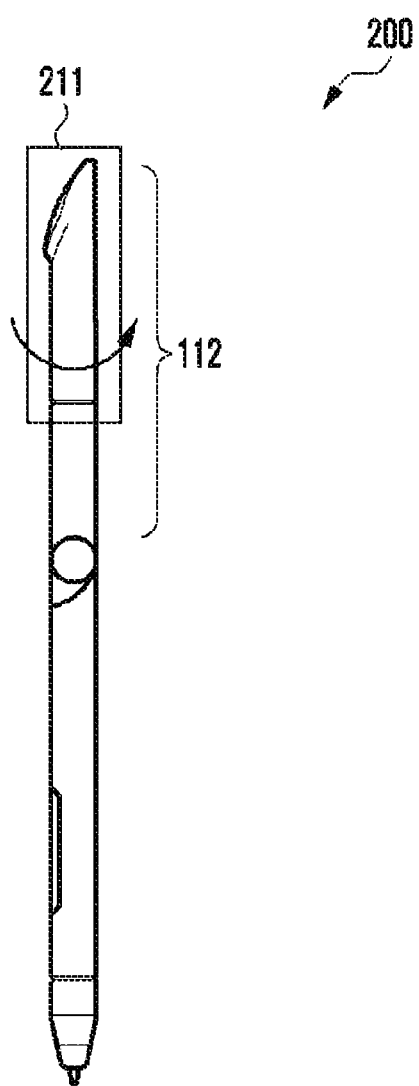
FIGS. 2A to 2D are diagrams illustrating a longitudinal extension of a supporting apparatus in accordance with an embodiment of the present invention.

As shown in FIG. 2A, the extension cover 211 may be formed at the upper part of the second body 112. For example, the extension cover 211 may be designed to allow rotation by means of a screw formed therein. Therefore, the extension cover 211 may be opened or closed depending on a rotation direction. In an embodiment of the present invention, by turning the extension cover 211 in one direction shown in FIG. 2A (for example, the direction of loosening a tightened screw), the extension cover 211 may be loosened.

Figure 2B:
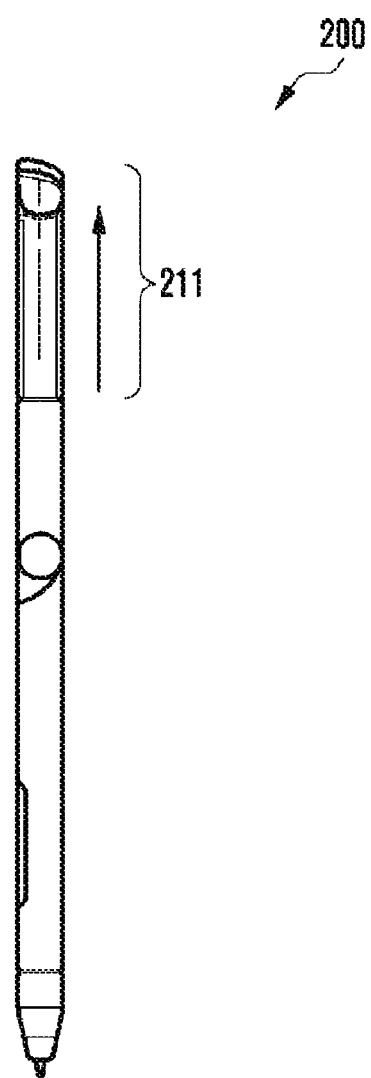
Figure 2C:
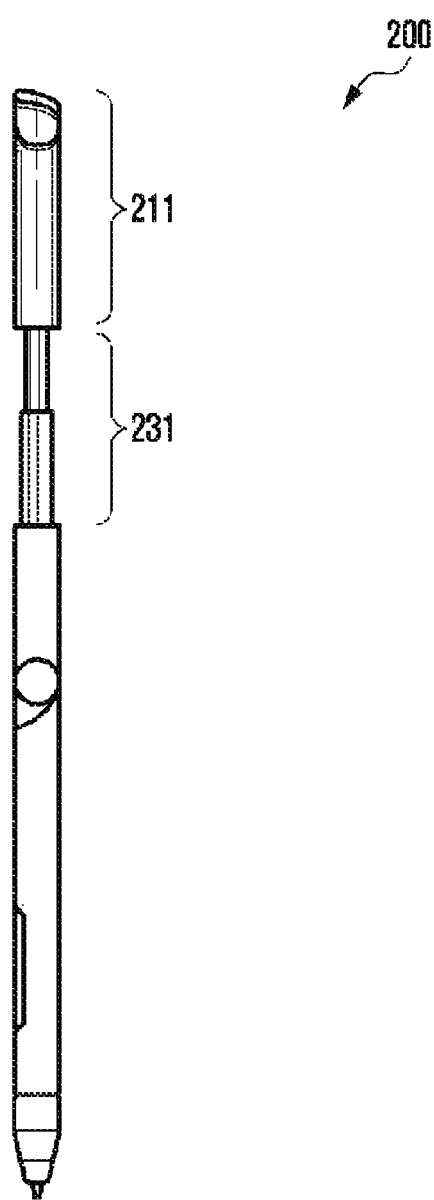

Thereafter, if a user pulls the extension cover 211 as shown in FIG. 2B, the extension cover 211 is moved in the direction of extending the extension part 231. That is, when the extension cover 211 moves upward, the extension part 231 hidden in the extension cover 211 comes to appear and is extended longitudinally as shown in FIG. 2C. In the end, the second body 112 is extended in length by the extension part 231.

The present invention is not limited to the above-discussed embodiment, and the extension cover 211 may be formed without a screw. That is, the extension cover 211 may be tightly fitted to the extension part 231 and released from the extension part 231 by an external force. For example, when a tractive force is applied to the extension cover 211, the extension part 231 can be extended longitudinally and hence the second body 112 can also be extended in length. In addition, when a compressive force is applied to the extension cover 211, the extension part 231 can be hidden again in the second body 112 and also the extended second body 112 can be retracted in length.

According to an embodiment of the present invention, the extension part 231 may be formed in a foldable tube structure. That is, the extension part 231 may be composed of two or more overlapped tubes having different diameters.

When the extension cover 211 is closed as shown in FIG. 2B, the extension part 231 may be hidden in the extension cover 211. If the extension cover 211 is moved upward as shown in FIG. 2B, the extension part 231 can be extended longitudinally as shown in FIG. 2C and thus the supporting apparatus 200 may increase in length.

Figure 2D:
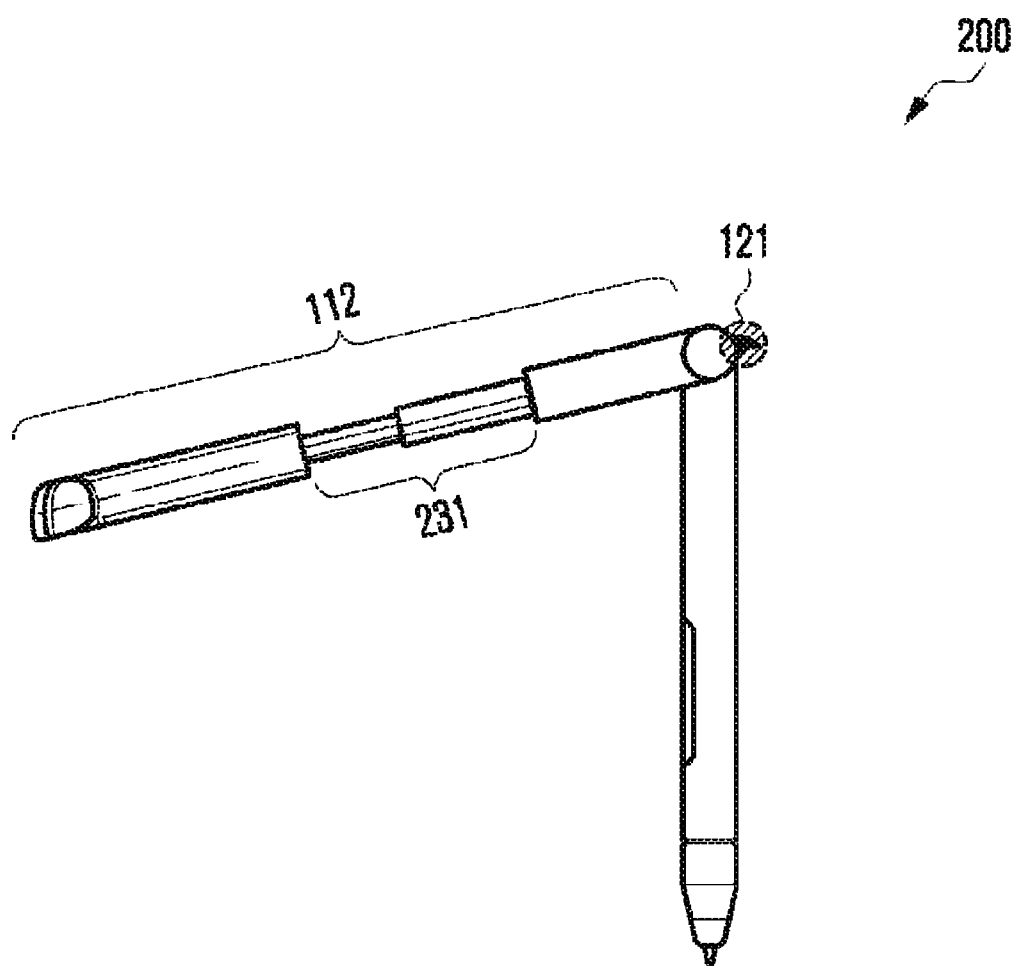

In another embodiment of the present invention, the extension part 231 may be extended by means of a resilient member such as a spring. In yet another embodiment of the present invention, the extension part 231 may be extended by means of an inherent property thereof (for example, rubber composites). Meanwhile, as shown in FIG. 2D, the supporting apparatus 200 may be folded with the second body 112 extended in length. In this case, it is possible to support the electronic device with a larger adjustable range of the supporting angle.

A combination scheme of the supporting apparatus and the electronic device will be described with reference to FIGS. 3 to 4C.

Figure 3:
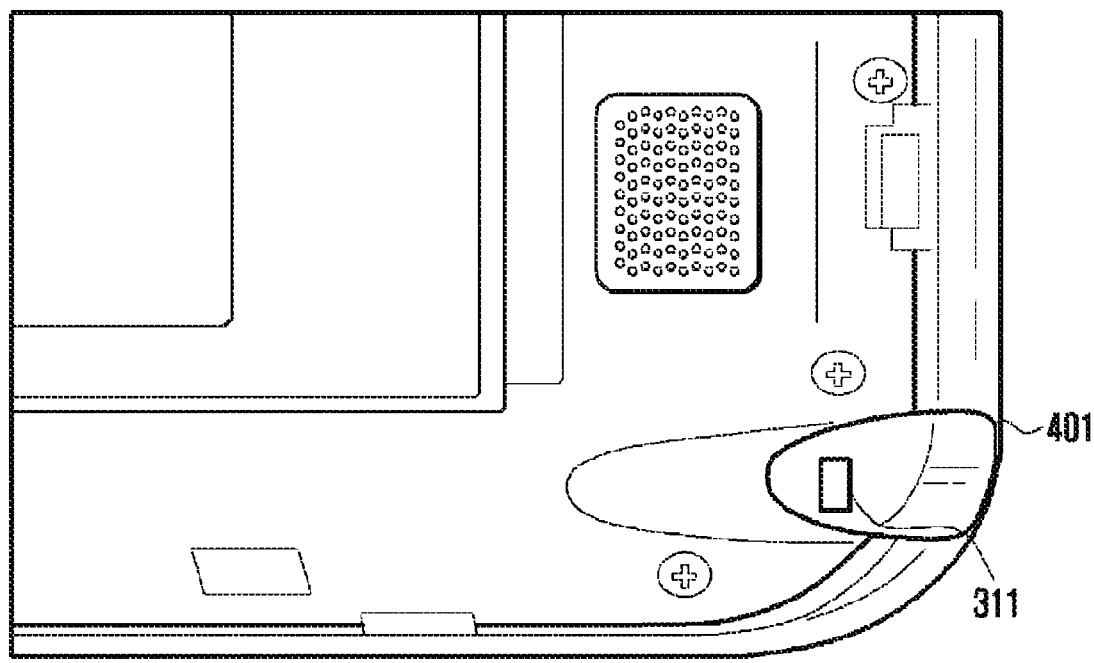
FIG. 3 is a diagram illustrating a groove for fastening a protrusion of a supporting apparatus in accordance with an embodiment of the present invention.

FIG. 3 is a diagram illustrating a groove 311 for fastening the protrusion 121 of the supporting apparatus in accordance with an embodiment of the present invention. The groove 311 may be formed on an inner sidewall of an insertion hole 401 in the electronic device. The supporting apparatus 200 may be inserted into the insertion hole 401, and the protrusion 121 may be inserted into the groove 311. For preventing abrasion of the protrusion 121, the groove 311 may be formed of soft material such as rubber.

According to an embodiment of the present invention, the supporting apparatus 200 may have no protrusion 121. For example, if the supporting apparatus 200 has no cylindrical shape and has a polygonal section and also if at least part of the insertion hole 401 of the electronic device has the same section as that of the supporting apparatus, the supporting apparatus can be fixed to the electronic device without protrusion. For example, such a polygonal section may be a tetragonal section, a pentagonal section, a hexagonal section, or the like. However, even if it is not a polygonal section, any other special shape may be available for fixing the supporting apparatus to the electronic device.

Figure 4A:
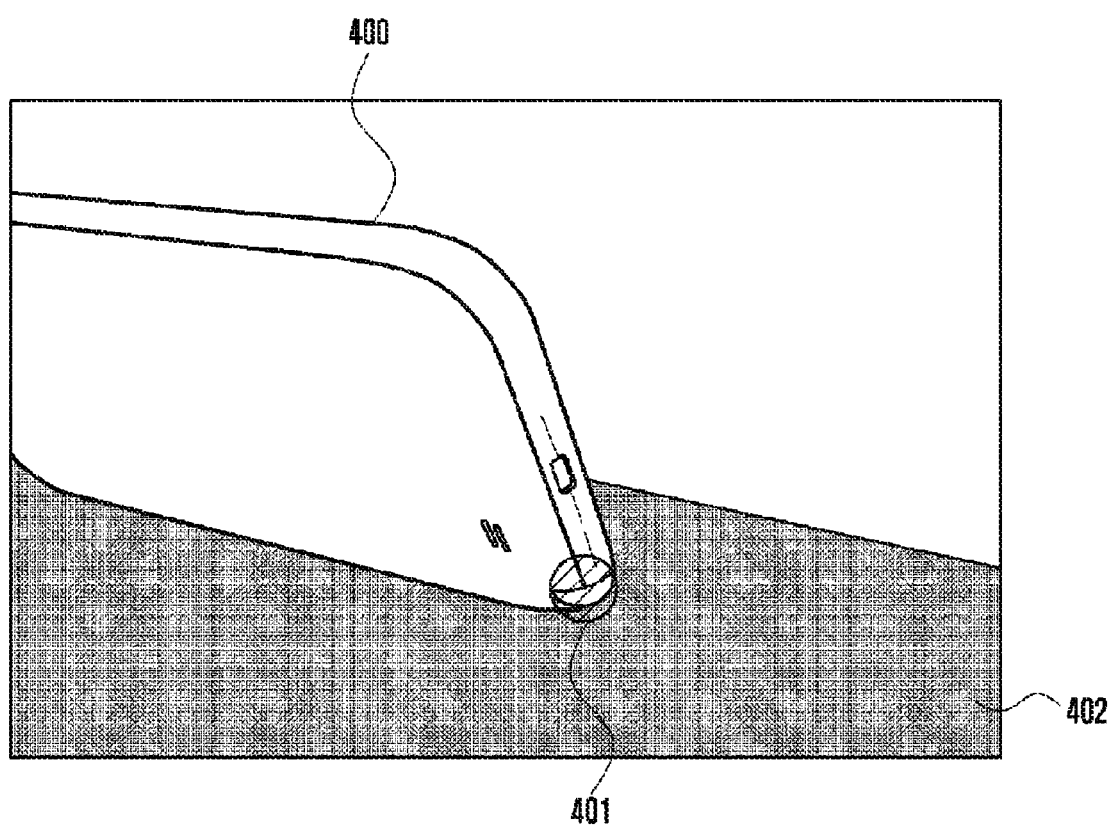
FIGS. 4A to 4C are diagrams illustrating the operation of supporting an electronic device by a supporting apparatus in accordance with an embodiment of the present invention.
Figure 4B:
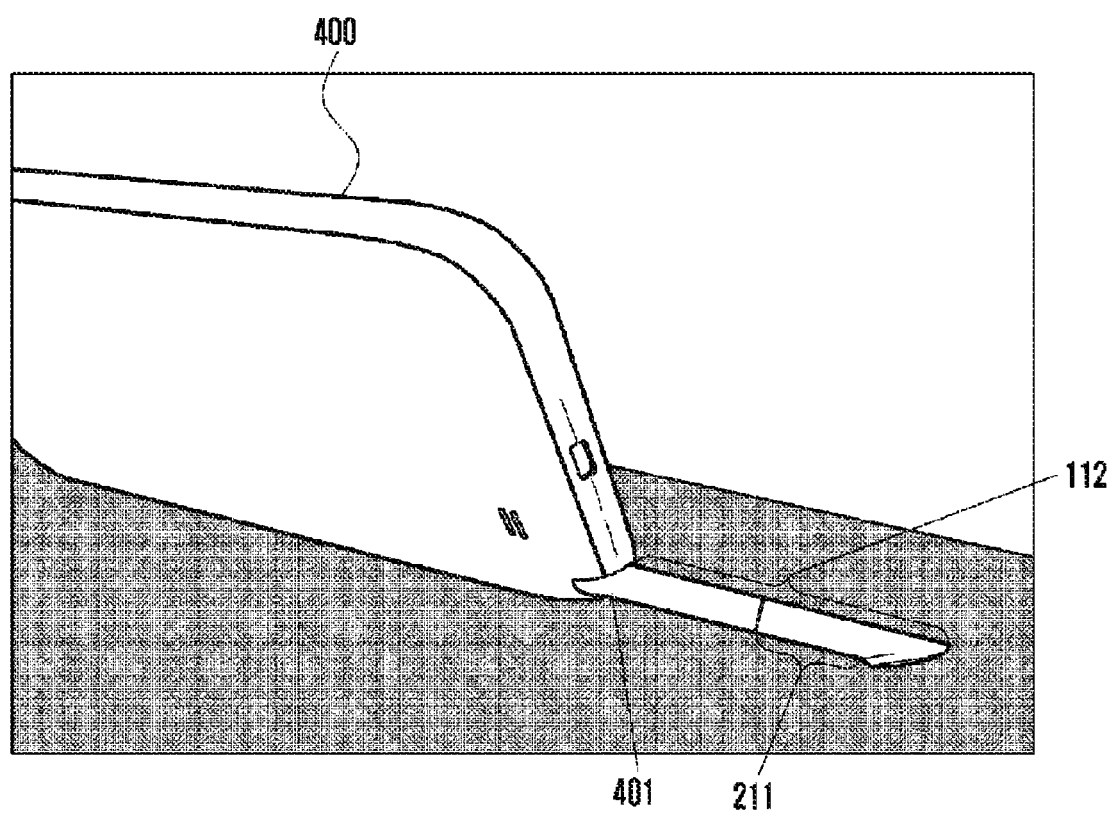

FIG. 4A shows the insertion hole 401 formed in an electronic device housing 400 in accordance with an embodiment of the present invention. Referring to FIG. 4A, the electronic device housing 400 is placed on a floor 402 so that the insertion hole 401 is adjacent to the floor 402. FIG. 4B shows the supporting apparatus 200 unfolded and inserted into the insertion hole 401 of the electronic device in accordance with an embodiment of the present invention. Particularly, in FIG. 4B, the second body 112 of the supporting apparatus 200 is half-inserted in the insertion hole 401 and part of the supporting apparatus 200 remains at the outside of the insertion hole 401.

Figure 4C:
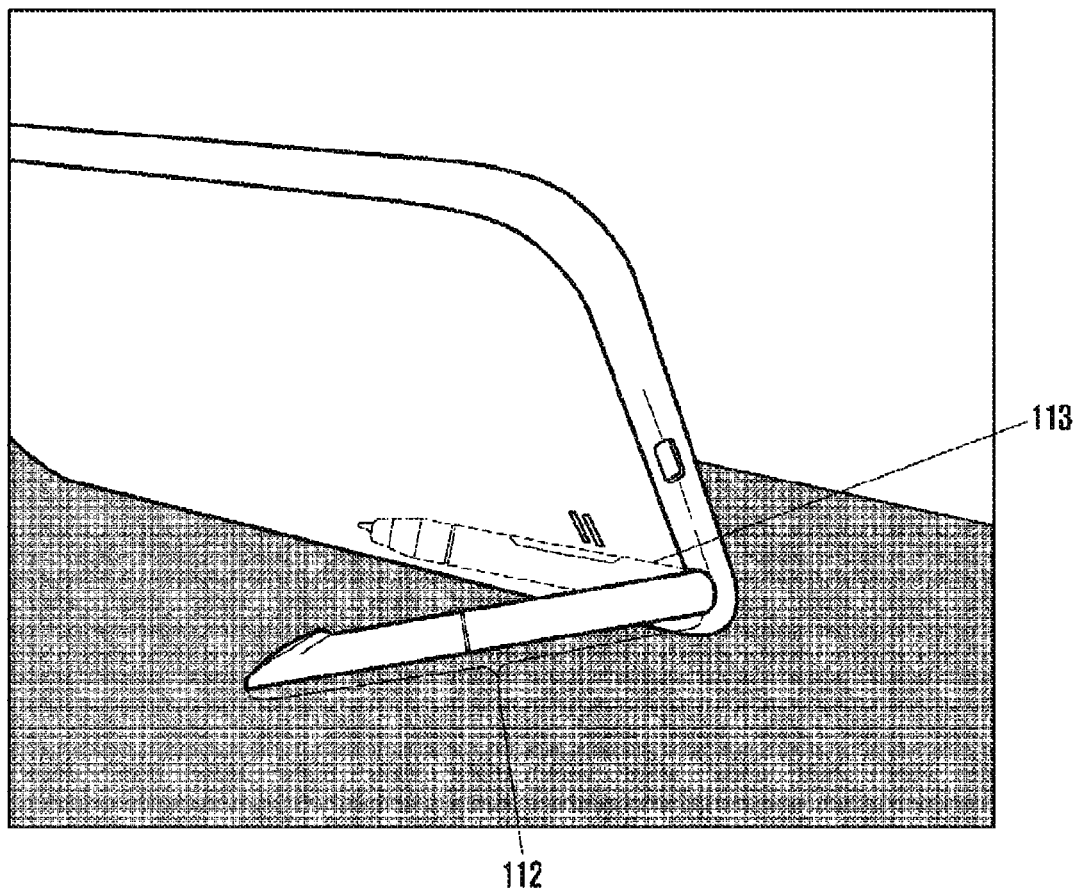

FIG. 4C shows the supporting apparatus 200 folded and inserted into the electronic device in accordance with an embodiment of the present invention. The first body 113 of the supporting apparatus 200 is located in the insertion hole 401. Additionally, although not shown, the protrusion 121 of the supporting apparatus 200 may be inserted into groove 311 of the electronic device so as to fix the supporting apparatus 200.

In an embodiment of the present invention, when the supporting apparatus 200 is half-inserted into the insertion hole 401 of the electronic device and folded, the first body 113 of the supporting apparatus 200 is located in the insertion hole 401, and the second body 112 of the supporting apparatus 200 supports the electronic device housing 400 at the outside of the insertion hole 401 as shown in FIG. 4C. As discussed above, a folded angle of the supporting apparatus 200 may be determined as a specific angle for stably supporting the electronic device.

A supporting angle depending on the angle of the groove 311 in accordance with an embodiment will be described with reference to FIGS. 5A to 6C.

Figure 5A:
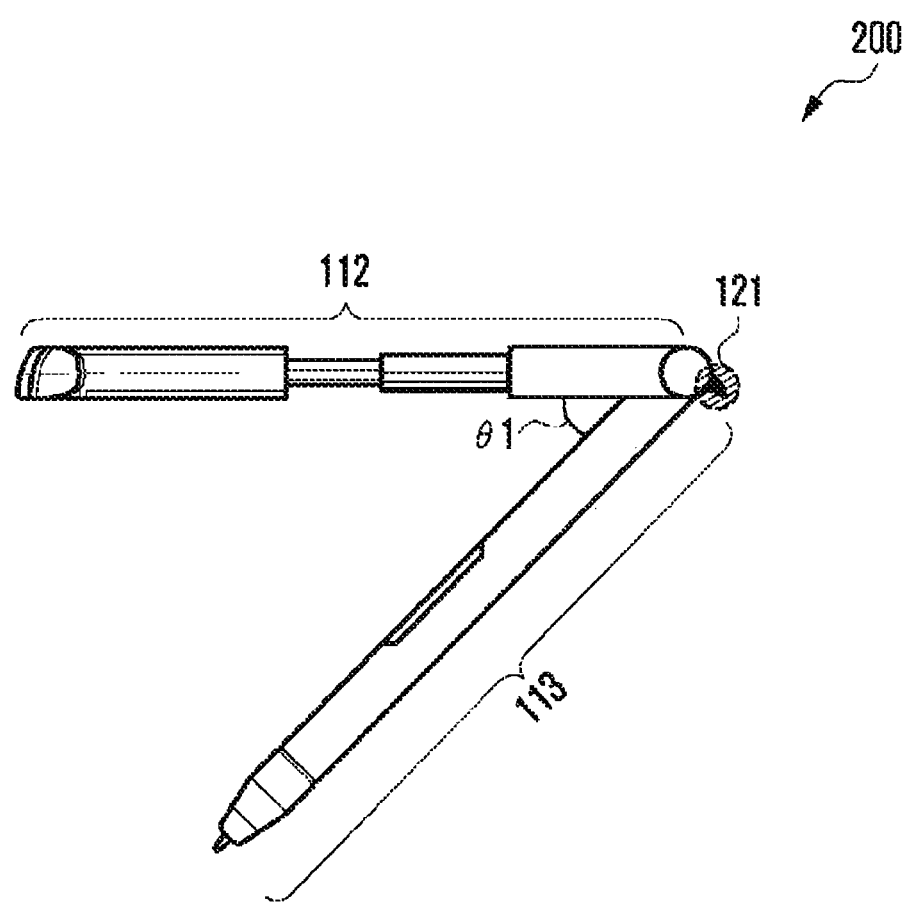
FIGS. 5A-5C and 6A-6C are diagrams illustrating a supporting function depending on an angle of a groove and a folded angle of a supporting apparatus in accordance with various embodiments of the present invention.
Figure 5B:
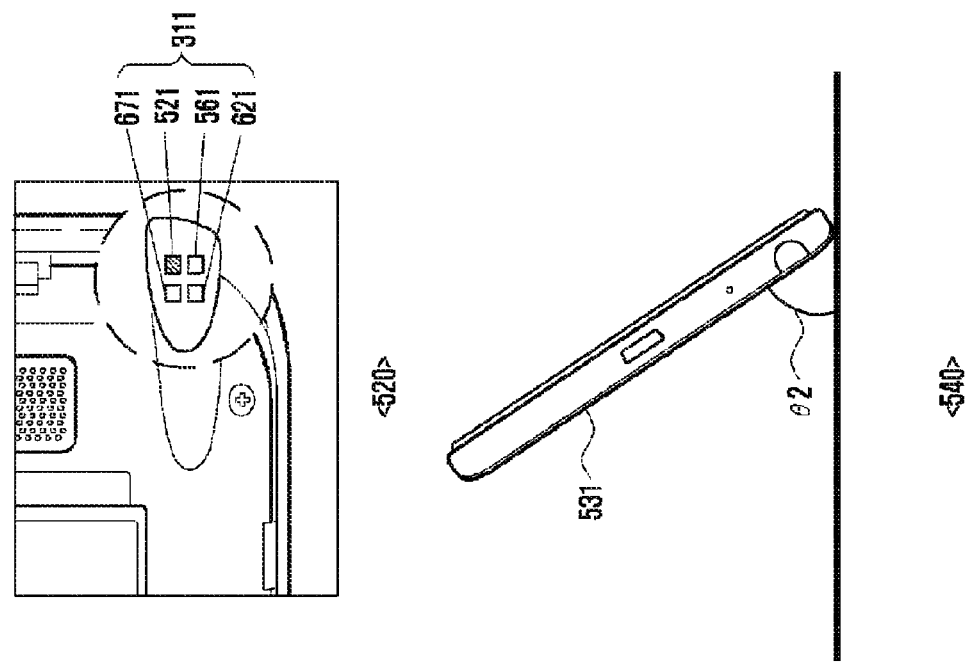
Figure 5B:
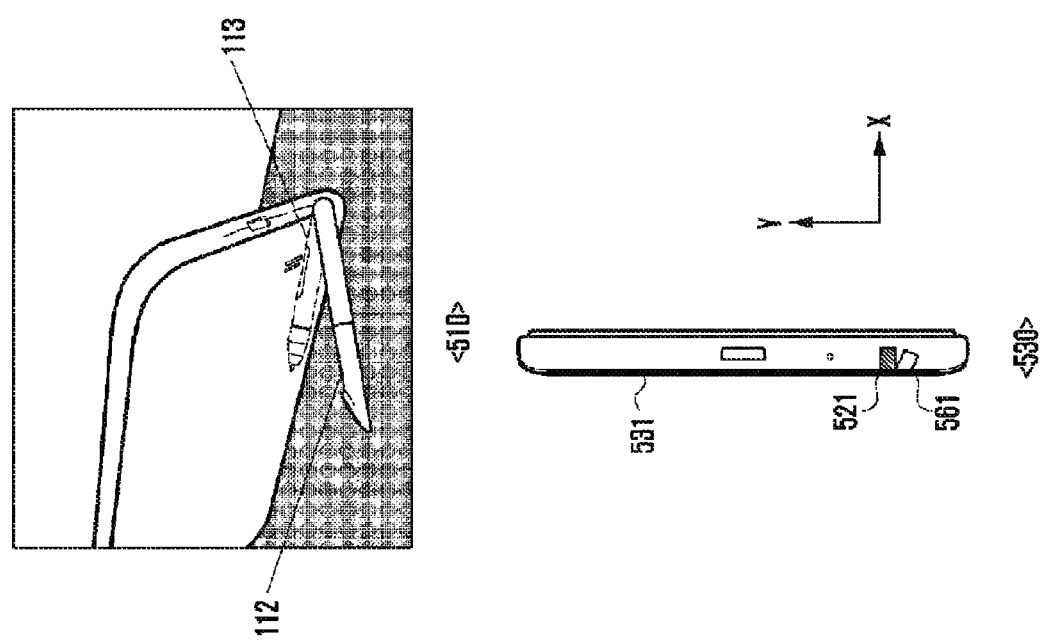
Figure 5C:
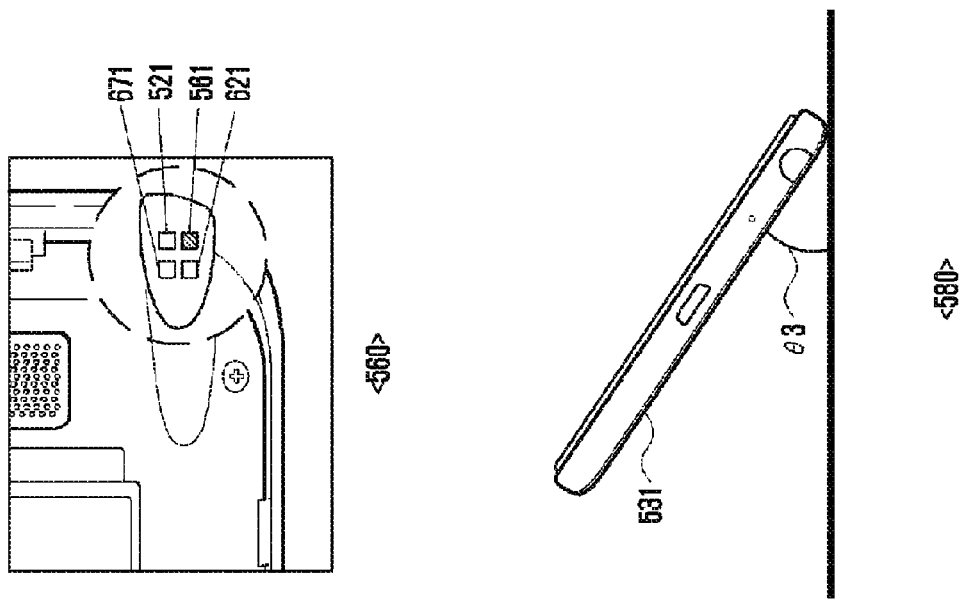
Figure 5C:
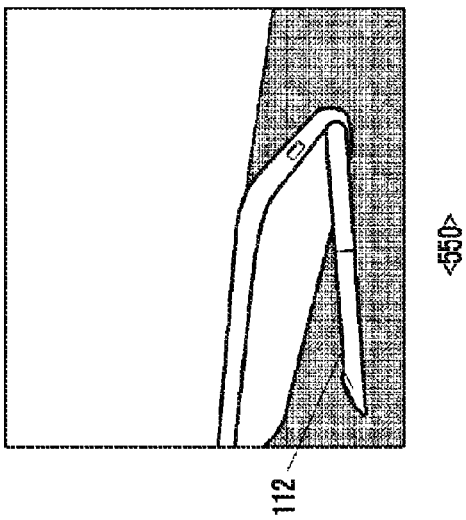
Figure 5C:
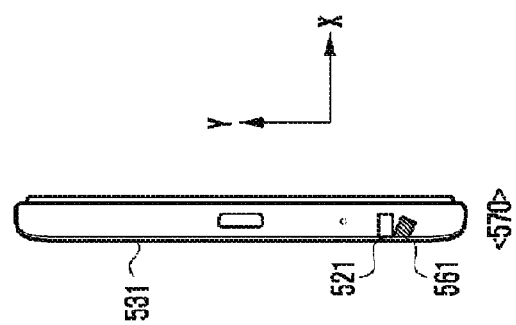
Figure 6A:
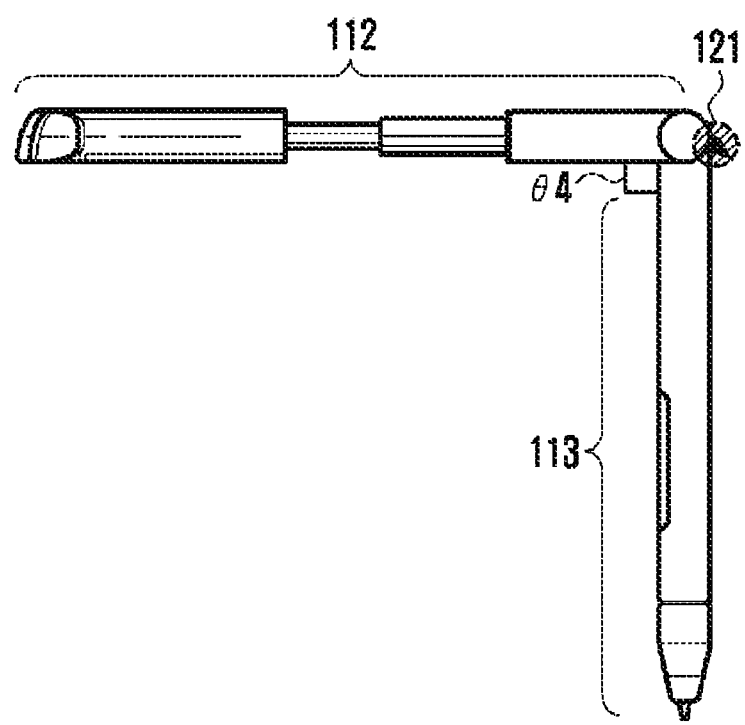
Figure 6B:
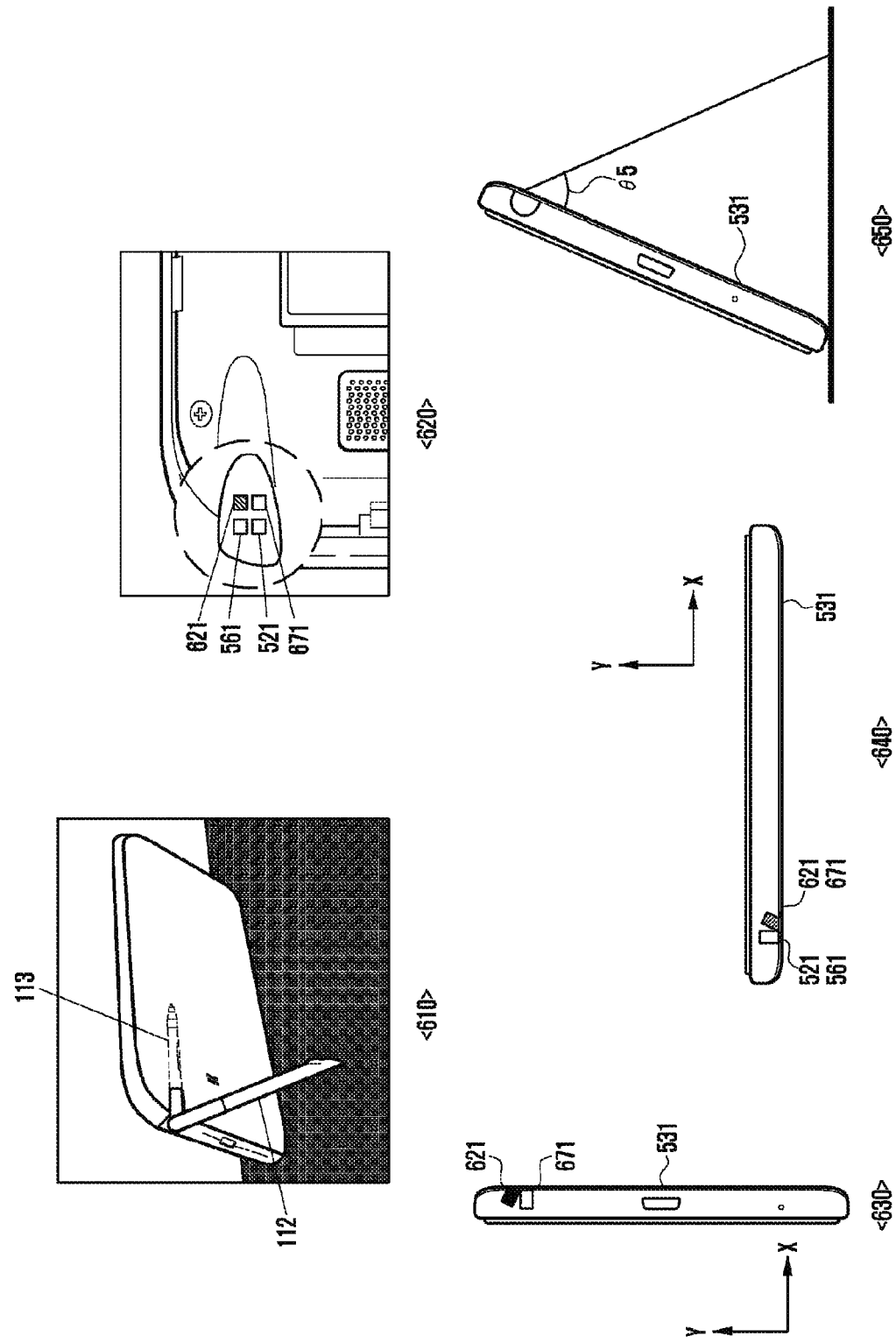
Figure 6C:
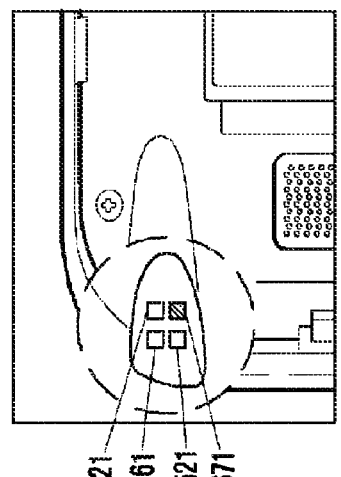
Figure 6C:
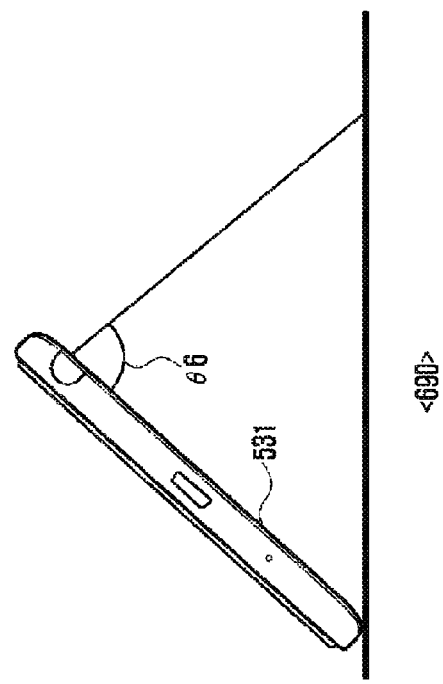
Figure 6C:
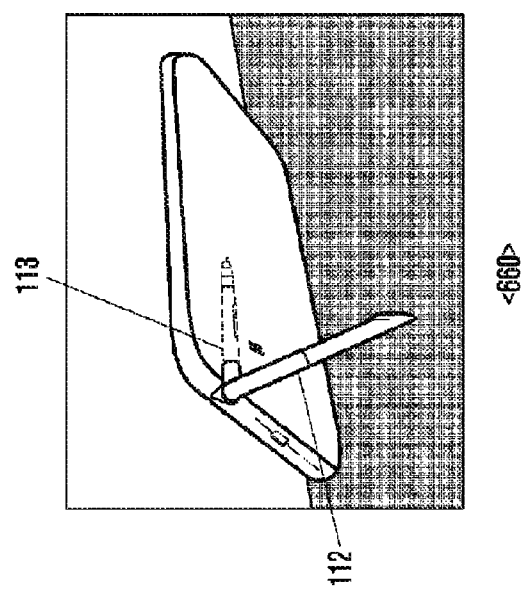
Figure 6C:
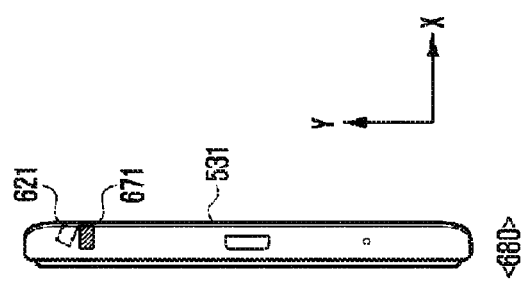

FIGS. 5A to 6C are diagrams illustrating a variation in a supporting angle depending on the angle of the groove 311 and a folded angle of the supporting apparatus 200 in accordance with an embodiment of the present invention. In FIGS. 5A to 5C, the supporting apparatus 200 performs a supporting function while being located at a lower part of the electronic device. In FIGS. 6A to 6C, the supporting apparatus 200 performs a supporting function while being located at an upper part of the electronic device.

According to an embodiment of the present invention, an angle between the second body 112 and the protrusion 121, an angle between the groove 311 and the rear surface of the electronic device, or the like may be different from examples shown in FIGS. 5A to 6C.

Additionally, depending on an angle between the second body 112 and the protrusion 121, an angle formed by the groove 311 and the rear surface or lateral surface of the electronic device may be varied. Nevertheless, respective drawings are provided as examples showing that an angle of supporting the electronic device by the supporting apparatus may be varied according to the angle or position of the groove 311.

FIG. 5A shows that the first body 113 and the second body 112 are in a folded state while forming the first angle (θ1). A reference numeral 510 in FIG. 5B shows that the supporting apparatus 200 folded at the first angle (θ1) is inserted into the insertion hole 401 of the electronic device.

A reference numeral 520 in FIG. 5B shows four grooves 521, 561, 621 and 671 formed in the insertion hole 401 of the electronic device. Two grooves 521 and 561 will be described with reference to FIGS. 5B and 5C, respectively, whereas the other grooves 621 and 671 will be described with reference to FIGS. 6B and 6C, respectively. As such, a plurality of grooves may be formed and used. The respective grooves may be formed at different angles or different locations. Depending on an angle between each groove and the insertion hole 401, the angle formed between electronic device and a floor or supporting surface may be varied.

A reference numeral 530 in FIG. 5B shows a lateral view of the electronic device. As shown, the groove 521 is formed laterally in the X-axis direction at the lower part of the electronic device. That is, the groove 521 in this embodiment is formed at a nearly right angle to the Y-axis. As shown in a reference numeral 540 in FIG. 5B, when the protrusion 121 of the supporting apparatus is inserted into the groove 521, an angle between the electronic device and a floor or ground may be the second angle (θ2).

FIG. 5C shows that the supporting apparatus folded at the first angle (θ1) shown in FIG. 5A is inserted into the electronic device and also supports the electronic device at the third angle (θ3) smaller than the second angle (θ2) shown in FIG. 5B.

According to an embodiment of the present invention, in FIG. 5C, an angle formed by the second body 112 (exposed to the outside of the electronic device) and the first body 113 (or the insertion hole 401) is the first angle (θ1), which is identical to an angle between the second body 112 and the first body 113 as shown in 510 of FIG. 5B. A reference numeral 550 in FIG. 5C shows that a supporting angle of the second body 112 for supporting the electronic device (i.e., an angle between the electronic device and a floor or supporting surface) is smaller than that in 510 of FIG. 5B. For example, for a relatively smaller angle between the second body 112 and the electronic device, the groove 561 for receiving the protrusion 121 may be used. When the protrusion 121 is inserted into the groove 561, an angle formed by the second body 112 and the Y-axis may be smaller than an angle formed when the protrusion is inserted into the groove 521 as shown in 530 of FIG. 5B. If the protrusion is inserted into the groove 561 as shown in 570, the supporting apparatus may be placed relatively closer to the rear surface of the electronic device. For example, if the protrusion of the supporting apparatus folded at the first angle (θ1) is inserted into the groove 561 shown in 570, the electronic device may be supported at the third angle (θ3), as shown in 580, which is relatively smaller than the second angle (θ2) shown in 540 of FIG. 5B.

FIGS. 6A to 6C show another case in which a folded angle between the first and second bodies 113 and 112 is the fourth angle (θ4) greater than the first angle (θ1).

FIG. 6A shows that a folded angle between the first and second bodies 113 and 112 is the fourth angle (θ4). The fourth angle (θ4) may be a right angle, for example.

Referring to 610 in FIG. 6B, the first body 113 of the supporting apparatus is folded at a right angle and inserted into the insertion hole of the electronic device, and the second body 112 is exposed to the outside and supports the electronic device. According to an embodiment, the insertion hole is located at an upper part of the electronic device, and the second body 112 of the supporting apparatus may reach, at the tip thereof, a floor or ground. That is, the supporting apparatus may perform a supporting function while being located at the upper part of the electronic device.

In this case, a groove 621 for receiving the protrusion 121 of the supporting apparatus is shown in 620 and 630. A reference numeral 620 shows a plurality of grooves formed in the insertion hole 401. A reference numeral 630 shows a lateral view of the electronic device which stands widthwise. In 630, the right side surface corresponds to the rear surface 531 of the electronic device.

As shown in 620, the groove 621 may be located relatively inward in the insertion hole 401. For example, assuming that an angle between the first and second bodies 113 and 112 is 90 degrees and that an angle between the first body 131 and the protrusion 121 is 30 degrees. In this case, an angle between the groove 621 and the insertion hole 401 should also be 30 degrees, and it may be desirable that the groove 621 is located inwardly in the insertion hole so that the supporting point may be located closer to the center of the rear surface of the electronic device.

A reference numeral 640 shows a top view of the electronic device which stands widthwise. In 640, the bottom surface of the electronic device is the rear surface 531 of the electronic device, and the top surface is the front surface on which a screen is displayed. Also, in 640, the Y-axis corresponds to the lateral surface of the electronic device, and the grooves are formed in the direction from the rear surface to the front surface of the electronic device. Referring to 640, an angle between the X-axis and the groove 521 or 561 for receiving the protrusion of the supporting apparatus folded at the first angle (θ1) may be relatively closer to a right angle than an angle between the X-axis and the groove 621 or 671 for receiving the protrusion of the supporting apparatus folded at the fourth angle (θ4). This difference in angle with the X-axis may be caused by a difference in angle between the protrusion 121 and the first body 113.

According to an embodiment of the present invention, when the protrusion is inserted into the groove 621, an angle between the second body 112 of the supporting apparatus and the Y-axis in 630 becomes relatively smaller than that when the protrusion is inserted into the groove 671. An angle between the groove 621 and the Y-axis in 630 may affect an angle (i.e., a supporting angle) between the second body 112 and the rear surface of the electronic device. As shown in 650, an angle between the second body 112 and the electronic device after the protrusion 121 is inserted into the groove 621 is referred to as the fifth angle (θ5).

According to an embodiment of the present invention, a reference numeral 660 in FIG. 6C shows that the supporting apparatus folded at the fourth angle (θ4) as shown in FIG. 6A is inserted into the electronic device at a relatively smaller supporting angle (i.e., at a relatively greater angle between the electronic device and the second body 112). A reference numeral 670 shows a rough position of the groove 671 for receiving the protrusion of the supporting apparatus. This groove 671 may have a relatively smaller angle formed with respect to the rear surface of the electronic device (as seen from a top view as shown in 640) compared to that of groove 521, which corresponds to an angle between the protrusion 121 and the first body 113. A reference numeral 680 shows a lateral view of the electronic device, and the groove 671 is relatively closer to a right angle with respect to the Y-axis than the groove 621. In 680, the left side surface indicates the front surface of the electronic device, and the right side surface indicates the rear surface 531 of the electronic device. When the protrusion of the supporting apparatus folded at the fourth angle (θ4) is inserted into the groove 671, an angle between the second body 112 and the rear surface 531 of the electronic device may become relatively greater than an angle formed when the protrusion is inserted into the groove 621. Therefore, the sixth angle (θ6) in 690 is greater than the fifth angle (θ5), and hence a supporting angle between the electronic device and the floor or supporting surface in 690 becomes smaller than that in 650.

Although specific angles are used in FIGS. 5A to 6C, these are only examples and should not be considered as to limit the present invention. Alternatively, the above-discussed grooves may be formed to have other various angles. Additionally, a folded angle of the supporting apparatus is not limited to the first angle (θ1) and the fourth angle (θ4) discussed above. Further, the protrusion 121 of the supporting apparatus is not limited to a single protrusion. Alternatively, the supporting apparatus may have two or more protrusions, and thus an angle of supporting the electronic device may be determined depending on an angle between the second body 112 and a specific protrusion inserted into the groove 311 among such protrusions.

As discussed hereinbefore in various embodiments of the present invention, the apparatus for supporting the electronic device includes the first body configured to be inserted into the insertion hole of the electronic device, and the second body configured to adjust an angle with respect to the first body, and to support the electronic device at the outside of the electronic device. A supporting angle of the electronic device is adjustable based on the angle between the first body and the second body.

Additionally, the insertion hole may have a polygonal section and also the first body may have the polygonal section same as that of the insertion hole. Also, the apparatus may further include the folding joint configured to release the first and second bodies from each other by an external force, and to adjust the angle between the first and second bodies. The folding joint may have the toggle button located between the first and second bodies, and the folding joint may release the first and second bodies from each other when the toggle button is pressed, and also fix the first and second bodies to each other when the toggle button is restored. The folding joint may be located between the first and second bodies, and configured to adjust the angle between the first and second bodies to a predetermined angle or a selected angle.

The second body may include the extension cover which can be loosened by rotation and is removable from the first body. The second body may further include the extension part which can be extended in length according to a movement of the extension cover. The extension part may be formed in an overlapped tube structure covered with the extension cover. The apparatus may further include the at least one protrusion configured to be inserted into the groove formed in the insertion hole of the electronic device so as to fix the apparatus to the electronic device.

In various embodiment of the present invention, the housing of the electronic device may include the insertion hole configured to allow the supporting apparatus to be inserted therein, and the supporting apparatus includes the first body and the second body.

The insertion hole may be located at a lower part of the electronic device such that the second body of the supporting apparatus supports the electronic device in the form of touching a floor with a length side of the second body, or the insertion hole may be located at an upper part of the electronic device such that the second body of the supporting apparatus supports the electronic device in the form of touch the floor with one end of the second body.

A section of the insertion hole may have the shape same as a section of the supporting apparatus. The supporting apparatus may have a protrusion, and the insertion hole may have a groove into which the protrusion is inserted. The groove may be formed as a single groove on a sidewall of the insertion hole such that an angle between the groove and the insertion hole corresponds to an angle between the protrusion and the first body of the supporting apparatus folded at a predetermined angle. The groove may be formed as a plurality of grooves having different angles that allow a supporting angle of the electronic device to be adjustable when the supporting apparatus is inserted into the electronic device.

Additionally, the housing may have different supporting angles depending on an angle between the first body and the second body of the supporting apparatus and an angle between the groove and the insertion hole.

As discussed hereinbefore, the supporting apparatus according to various embodiment of the present invention employs an auxiliary unit of the electronic device as a supporting member for stably supporting the electronic device and thus requires no separate means for supporting the electronic device. Additionally, the supporting apparatus can be extended in length and hence perform an angle-adjustable supporting function.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for supporting an electronic device, the apparatus comprising:
    a first body configured to be inserted into an insertion hole of the electronic device; and
    a second body configured to adjust an angle with respect to the first body, and to support the electronic device at an outside of the electronic device,
    wherein a supporting angle of the electronic device is adjustable based on the angle between the first body and the second body, and
    wherein the first body comprises at least one protrusion configured to be inserted into a groove among a plurality of grooves formed in the insertion hole of the electronic device so as to support the electronic device at an angle corresponding to the groove.

2. The apparatus of claim 1, wherein the insertion hole has a polygonal section and the first body has the same polygonal section as that of the insertion hole.

3. The apparatus of claim 1, further comprising:
    a folding joint configured to release the first body and the second body from each other by an external force, and to adjust the angle between the first body and the second body.

4. The apparatus of claim 3, wherein the folding joint has a toggle button located between the first body and the second body, and
    wherein the folding joint releases the first body and the second body from each other when the toggle button is pressed, and secures the first body and the second body to each other when the toggle button is restored.

5. The apparatus of claim 3, wherein the folding joint is located between the first body and the second body, and configured to adjust the angle between the first body and the second body to a predetermined angle or a selected angle.

6. The apparatus of claim 1, wherein the second body includes an extension cover which can be loosened by rotation and is extendable from the first body.

7. The apparatus of claim 6, wherein the second body further includes an extension part which can be extended in length according to a movement of the extension cover.

8. The apparatus of claim 7, wherein the extension part is formed in an overlapped tube structure covered with the extension cover.

9. A housing of an electronic device, comprising:
    an insertion hole configured to allow an apparatus to be inserted therein, wherein the apparatus includes a first body and a second body,
    wherein the insertion hole has a plurality of grooves into which a protrusion of the apparatus is inserted, and
    wherein the plurality of grooves has different angles that allow a supporting angle of the electronic device to be adjustable when the apparatus is inserted into the electronic device.

10. The housing of claim 9, wherein the insertion hole is located at a lower part of the electronic device such that the second body of the apparatus supports the electronic device by touching a supporting surface, or the insertion hole is located at an upper part of the electronic device such that the second body of the apparatus supports the electronic device by connecting the upper part with the supporting surface.

11. The housing of claim 9, wherein a section of the insertion hole has a same shape as that of the apparatus.

12. The housing of claim 9, wherein an angle between the groove and the insertion hole corresponds to an angle between the protrusion and the first body of the apparatus folded at a predetermined angle.

* * * * *